(12) United States Patent
Thrift et al.

(10) Patent No.: US 6,688,653 B1
(45) Date of Patent: Feb. 10, 2004

(54) FITTING ASSEMBLY FOR FLUID AND VAPOR CONNECTION

(75) Inventors: Charles D. Thrift, Farmington Hills, MI (US); Darren Meacham, Deltona, FL (US)

(73) Assignee: TI Group Automotive Systems, LLC, Warren, MI (US)

(*) Notice: Subject to any disclaimer, the term of this patent is extended or adjusted under 35 U.S.C. 154(b) by 330 days.

(21) Appl. No.: 09/589,015

(22) Filed: Jun. 7, 2000

Related U.S. Application Data (63) Continuation-in-part of application No. 09/385,898, filed on Aug. 30, 1999, now Pat. No. 6,367,850.

(51) Int. Cl.[7] .................................................. F16L 55/00
(52) U.S. Cl. .................. 285/148.13; 285/222; 285/322; 285/382; 285/382.2; 285/382.5; 285/918
(58) Field of Search ........................... 285/148.13, 382, 285/322, 382.5, 382.2, 222, 918

(56) References Cited

U.S. PATENT DOCUMENTS

| | | | | |
|---|---|---|---|---|
| 3,343,252 A | * | 9/1967 | Reesor ......................... 29/458 |
| 3,726,321 A | * | 4/1973 | Phillips et al. .............. 138/123 |
| 3,876,454 A | * | 4/1975 | Snell et al. .................. 428/336 |
| 3,895,832 A | * | 7/1975 | Ellis et al. ................... 285/322 |
| 4,103,941 A | * | 8/1978 | Stoll ............................ 285/238 |
| 4,226,446 A | * | 10/1980 | Burrington ................... 285/256 |
| 4,522,435 A | * | 6/1985 | Miller et al. ................. 285/256 |
| 4,541,655 A | * | 9/1985 | Hunter ......................... 285/55 |
| 4,890,867 A | * | 1/1990 | Briggs et al. ................ 285/256 |
| 5,044,671 A | * | 9/1991 | Chisnell et al. ............... 285/55 |
| 5,096,231 A | * | 3/1992 | Chisnell et al. ............... 285/55 |
| 5,415,440 A | * | 5/1995 | Kanao .......................... 285/295 |
| 5,433,486 A | * | 7/1995 | Männl et al. ................ 285/114 |
| 5,462,313 A | * | 10/1995 | Rea et al. ..................... 285/21 |
| 5,470,113 A | * | 11/1995 | Schwalm et al. ............ 285/255 |
| 5,531,485 A | * | 7/1996 | House et al. ................ 285/230 |
| 6,190,751 B1 | * | 2/2001 | Sylvester .................... 428/66.4 |

\* cited by examiner

*Primary Examiner*—J. J. Swann
*Assistant Examiner*—Carlos Lugo
(74) *Attorney, Agent, or Firm*—Jenner & Block, LLC (57) ABSTRACT

A fitting assembly for fluid and vapor connection comprising a first tube, a second tube and a thin strip of polymeric material. A male member is formed at the end of the first tube. A hollow female body is formed at end of the second tube. The male member is received in the female body. The strip of polymeric material has a layer of adhesive applied to one surface of the strip. The strip is bonded to the male member and unbonded to the female body. The strip is compressed between the male member and the female body.

27 Claims, 6 Drawing Sheets

FITTING ASSEMBLY FOR FLUID AND VAPOR CONNECTION

This application is a continuation-in-part of application Ser. No. 09/385,898 filed on Aug. 30, 1999, now U.S. Pat. No. 6,367,850.

BACKGROUND OF THE INVENTION

This invention relates to fluid and vapor line systems which include fittings, and more particularly, to a fitting having an axially movable swaging ring.

For the automotive and other industries, fittings are commonly used to connect metal tubes and pipes to each other to provide a fluid or vapor connection.

One type of fittings often used is a ring having a conical bore for securing a male member formed at the end of a first tube inserted into a radially enlarged female body formed at the end of a second tube. For this type of fitting, the ring is loosely and slidably mounted on the first tube. The ring is mounted such that the enlarged diameter portion of the conical bore is directed toward the male member. To provide the fluid or vapor connection, the male member is first inserted into the female body. The ring is then slid along the first tube toward the female body and swaged over the female body with the male member inserted within. The swaging of the ring over the female body crushes the female body radially inward and creates a sealing surface between the female body and the male member. Once the ring is swaged over the female body, it retains the male member within the female body. The ring constantly applies a radially inward force to the female body. The female body reacts by applying a radially inward force to the male member. This radially inward force by the female body onto the male member prevents the male member from withdrawing from the female body, thus securing the male member within the female body. This type of fitting is prevalent in the art, and has proven effective in many fluid or vapor line applications.

Nevertheless, such fittings have occasionally been prone to failure. During insertion of the male member into the female body, the male member may not have been inserted sufficiently into the female body. Thus, when the ring is swaged over the female body, there is not sufficient surface between the crushed female body and the relational male member to form an effective sealing surface. Furthermore, if the male member has not been inserted sufficiently into the female body, upon swaging the ring over the female body the ring can bypass the portion of the female body overlaying the male member. Should such a situation occur, there is no radially inward force applied by the female body onto the male member, thus allowing the male member to be easily withdrawn from the female body.

While the swaging of the ring over the female body creates a sealing surface between the female body and the male member, the surface is still prone to leak should a gap develop between the female body and the male member.

One solution disclosed in prior art references is to apply a bonding agent onto the male member just prior to insertion of the male member into the female member. Examples of such bonding agents include solder and anaerobic. After insertion of the male member into the female body, the bonding agent bonds the outer surface of the male member to the inner surface of the female body. The bonding agent thus fills any gaps developed between the female body and the male member. However, the bonding agent must be applied just prior to insertion of the male member into the female body. Should the bonding agent be applied in advance, contaminants will adhere to the outer surface of the bonding agent. This lack of ability to apply the bonding agent in advance increases complexity and labor for the final assembly manufacturer's assembly plant.

Another disadvantage of this type of fitting is the need to install the ring onto the tube forming the male member just prior to the insertion of the male member into the female body. Since the ring is loosely and slidably mounted, the ring can slide off the end of the male member or up the tube away from the male member, thus preassembly of the ring onto the tube is not feasible. This lack of feasibility for preassembly of the ring increases complexity and labor for the final assembly manufacturer's assembly plant.

SUMMARY OF THE INVENTION

The present invention is directed to a fitting assembly for fluid and vapor connection comprising a first tube, a second tube and a thin strip of polymeric material. A male member is formed at the end of the first tube. A hollow female body is formed at end of the second tube. The male member is received in the female body. The strip of polymeric material has a layer of adhesive applied to one surface of the strip. The strip is bonded to the male member and unbonded to the female body. The strip is compressed between the male member and the female body.

DETAILED DESCRIPTION OF THE INVENTION

Figure 1:
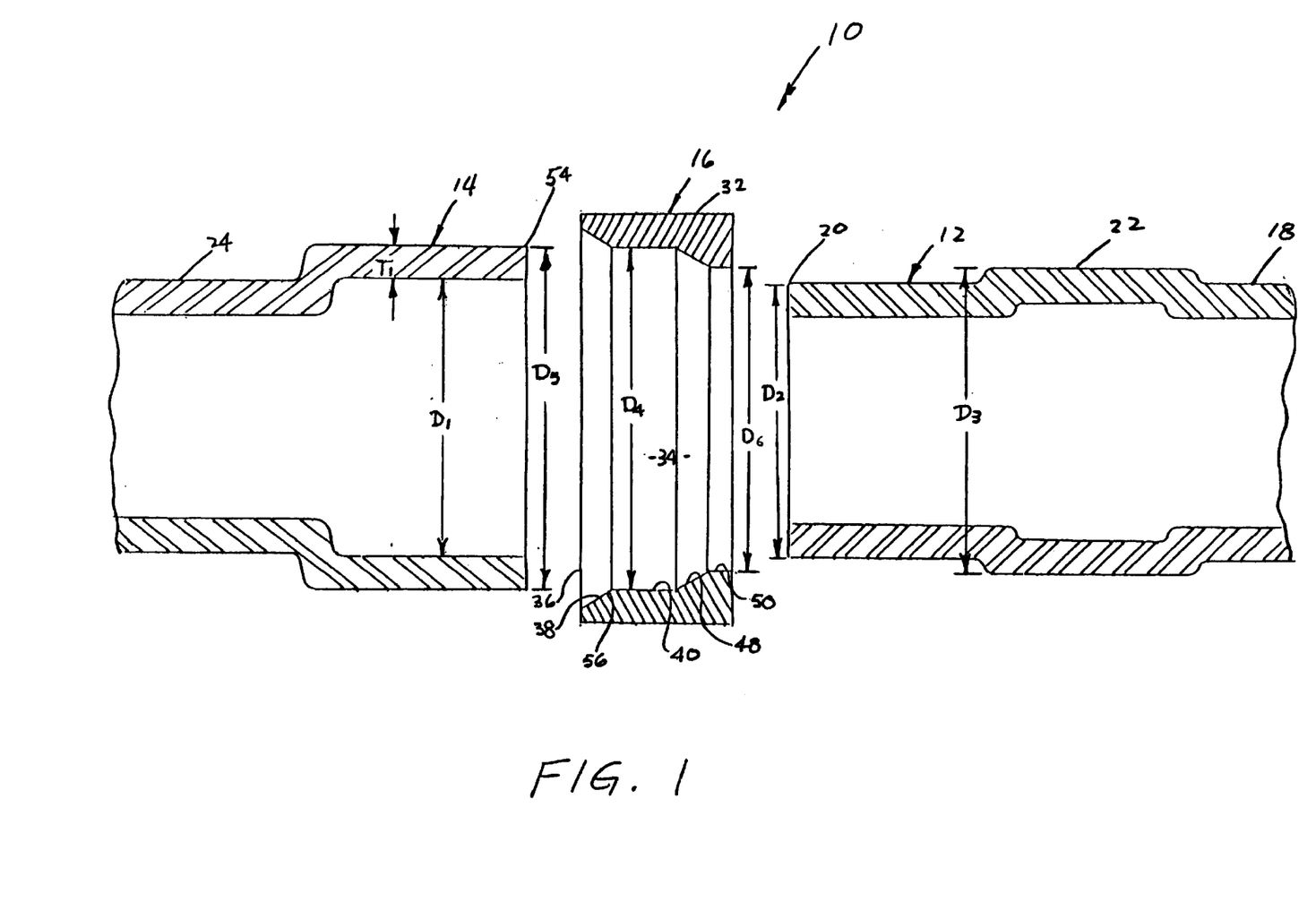
FIG. 1 is a sectional view of a first embodiment of a fitting assembly prior to assembly.
Figure 2:
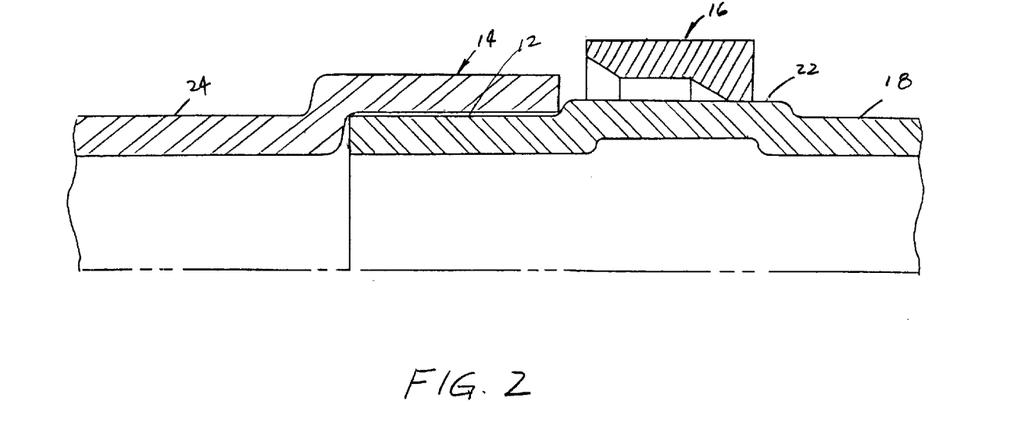
FIG. 2 is a partial section view of the fitting assembly of FIG. 1 after a ring is preassembled onto an upset and a male member is inserted into a female body.
Figure 3:
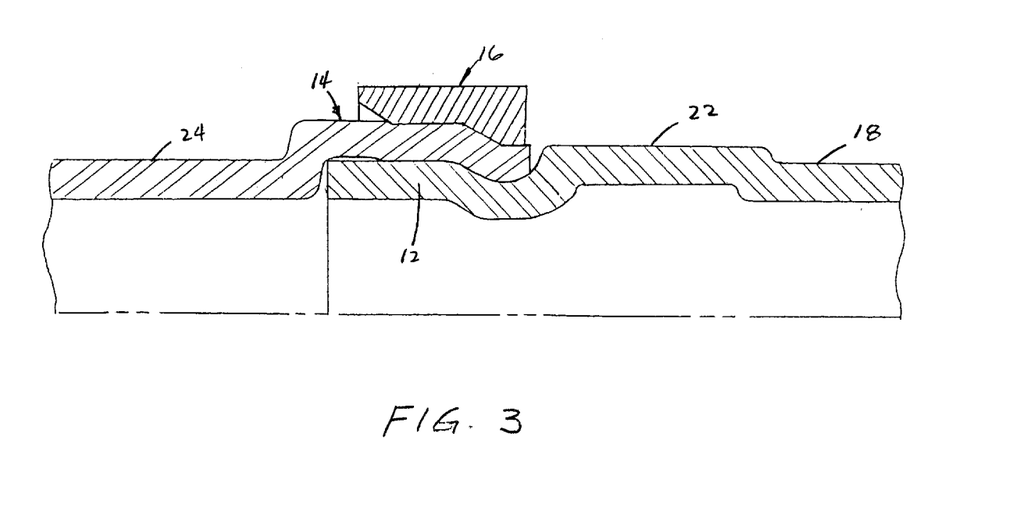
FIG. 3 is a partial sectional view of the fitting assembly of FIG. 1 after the ring is swaged over the female body.

FIGS. 1–3 illustrate a first embodiment of a fitting assembly of the present invention. The fitting assembly 10 comprises a male member 12, a female body 14 and a ring 16.

The male member 12 is formed at the end of a first hollow and rigid tube 18 which forms a part of a fluid line system. The tube 18 may lead to a component in a fluid line system, or may itself be a portion of a component in a fluid line system. Formed at a given distance from the distal end 20 of the male member 12 is a radially enlarged upset 22. The upset 22 is situated between the male member 12 and the remaining portion of the first tube 18.

The female body 14 is formed at the end of a second hollow and rigid tube 24 which forms the other part of a fluid line system. The female body 14 is enlarged radially in relation to the remaining portion of the second tube 24. The length of the female body 14 is slightly longer than the length of the male member 12. The inner diameter $D_1$ of the female body 14 is slightly larger than the outer diameter $D_2$ of the male member 12. The inner diameter $D_1$ of the female body 14 is smaller than the outer diameter $D_3$ of the upset 22 of the first tube 18.

The ring 16 has a generally cylindrical outer surface 32. The ring 16 has an axial bore 34 extending axially inward from an entrance 36. The entrance 36 is defined by a first conical surface 38. The first conical surface 38 acts as a lead-in surface to facilitate the swaging of the ring 16 over the female body 14. Axially inward from the first conical surface 38 is a first cylindrical surface 40. The diameter $D_4$ of the first cylindrical surface 40 is sized such that the first cylindrical surface 40 will crush the female body 14 radially inward, but will not crush the male member 12. Therefore, the diameter $D_4$ of the first cylindrical surface 40 is smaller than the outer diameter $D_5$ of the female body 14, but larger than the outer diameter $D_2$ of the male member 12 plus twice the wall thickness $T_1$ of the female body 14. Axially inward from the first cylindrical surface 40 is a second conical surface 48. The second conical surface 48 acts as a lead-in surface to a second cylindrical surface 50. The diameter $D_6$ of the second cylindrical surface 50 is sized such that the second cylindrical surface 50 will crush both the female body 14 and the male member 12 radially inward. Therefore, the diameter $D_6$ of the second cylindrical surface 50 is smaller than the outer diameter $D_2$ of the male member 12 plus twice the wall thickness $T_1$ of the female body 14.

The diameter $D_6$ of the second cylindrical surface 50 also sized to be slightly smaller than a portion of the upset 22 of the first tube 18, thus creating an interference fit between the second cylindrical surface 50 and a portion of the upset 22. The upset 22 as illustrated in FIGS. 1–3 has a cylindrical surface. However, it should be noted that the upset can have a further radially enlarged surface in which only the further radially enlarged surface of the upset creates an interference fit with the second cylindrical surface. The upset can also have a conical surface such that a portion of the conical upset creates an interference fit with the second cylindrical surface.

The first embodiment of a fitting assembly 10 functions as follows. The ring 16 is preassembled onto the upset 22 of the first tube 18. The ring 16 is slid axially onto the upset 22 such that the first conical surface 38 is directed toward the distal end 20 of the male member 12. Since a portion of the upset 22 creates an interference fit with the second cylindrical surface 50 of the ring 16, the ring is retained on the upset 22. This preassembly can be performed prior to the components of the fitting assembly arriving at the final assembly manufacturer's assembly plant, thus reducing the complexity and labor required at the assembly plant.

To connect the fitting assembly 10, the male member 12 is first inserted into the female body 14 until the terminal end 54 of the female body 14 abuts the upset 22 of the male member 12. Hence, the upset 22 does not only serve as a retainer for the ring 16 during preassembly, but the upset 22 also serves as a positive stop during the insertion of the male member 12 into the female body 14. The upset 22 allows for consistency in the amount of male member 12 inserted into the female body 14.

After the male member 12 is fully inserted into the female body 14, the ring 16 is slid axially toward the female body 14. As the ring is slid over the female body 14, the first conical surface 38 contacts the terminal end 54 of the female body 14. Thereafter, the trailing end 56 of the first conical surface 38 and the first cylindrical surface 40 apply a radially inward force, crushing the female body 14 radially inward, thus creating a sealing surface between the inner surface of the female body 14 and the outer surface of the male member 12. Once the second conical surface 48 contacts the terminal end 54 of the female body 14, the second conical surface 48 and the second cylindrical surface 50 further apply a greater radially inward force, crushing both the female body 14 and the male member 12. The crushed female body 14 and male member 12, along with the constant radially inward force applied by the ring 16, prevents the withdrawal of the male member 12 from the female body 14.

Figure 4:
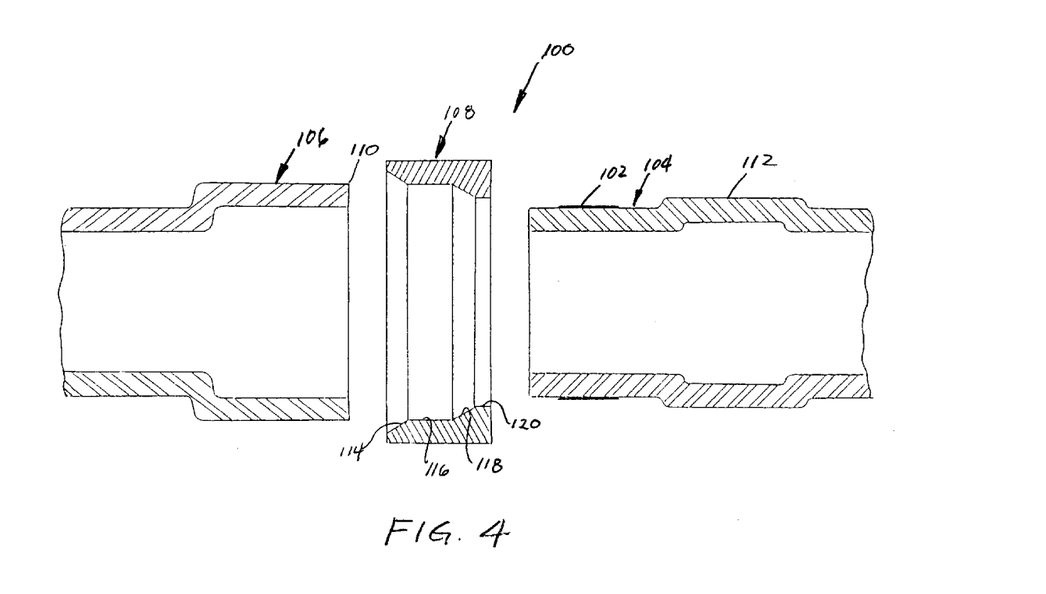
FIG. 4 is a sectional view of a second embodiment of a fitting assembly prior to assembly.
Figure 5:
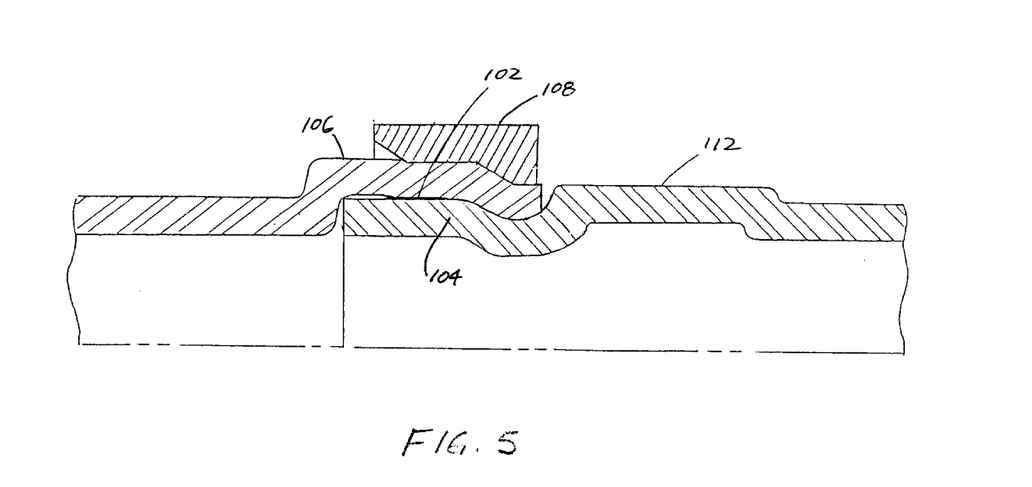
FIG. 5 is a partial sectional view of the fitting assembly of FIG. 4 after a ring is swaged over a female body.

FIGS. 4 and 5 illustrate a second embodiment of a fitting assembly 100 of the present invention. The second embodiment is the same as the first, but includes an additional sealing layer 102 surrounding a male member 104. The sealing layer 102 is a thin layer of polymeric material bonded to the male member 104, but is not bonded to a female body 106. Since the sealing layer does not have any adhesion characteristic on the outer surface, the concern of contaminants attaching to the sealing layer has been eliminated, thus the sealing layer can to be applied to the male member well before the male member 104 is inserted into the female body 106.

Suitable polymeric materials for the sealing layer 102 include, but are not limited to, elastomers, fluoropolymers, polyamides, polyesters, polyurethanes, polyvinyl chlorides, polyketones, polyolefins and mixtures thereof. The preferred polymeric material for forming the sealing layer is elastomer. The polymeric material can be applied by being painted onto the male member. A brush is used to coat the male member with the liquid form of the polymeric material onto the male member. A liquid form of the polymer material can also be extruded around the male member through use of an extruder.

Alternatively, the polymeric material can be formed into thin strips. A layer of adhesive is applied to one side of the strip. The strip of polymeric material with adhesive applied can be rolled up for storage, similar to a roll of tape. The rolled strip can later be spirally wrapped around the male member to provide a layer of polymeric material surrounding and bonded to the male member.

The strip of polymeric material is applied to the portion of the male member 104 radially inward of a swaging ring 108 after the ring 108 has been fully swaged around the female body 106.

The second embodiment of a fitting assembly 100 functions the same as the first embodiment, but provides a sealing layer which fills any gap between the male member 104 and the female body 106. A layer 102 of polymeric material is pre-applied to the outer surface of the male member 104. The male member 104 is inserted into the female body 106 until the terminal end 110 of the female body 106 abuts an upset 112 formed axially inward of the male member 104. The ring 108 is slid over the female body 106. The trailing end of a first conical surface 114 and a first cylindrical surface 116 apply a radially inward force, crushing the female body 106 radially inward. Located between the male member 104 and the female body 106 is the layer 102 of polymeric material. The radially inward force compresses the layer 102 of polymeric material tightly between the male member 104 and the female body 106 to create an effective seal.

A second conical surface 118 and a second cylindrical surface 120 then apply a greater radially inward force, crushing the female body 106 and the male member 104 radially inward to prevent the male member 104 from withdrawing from the female body 106.

Figure 6:
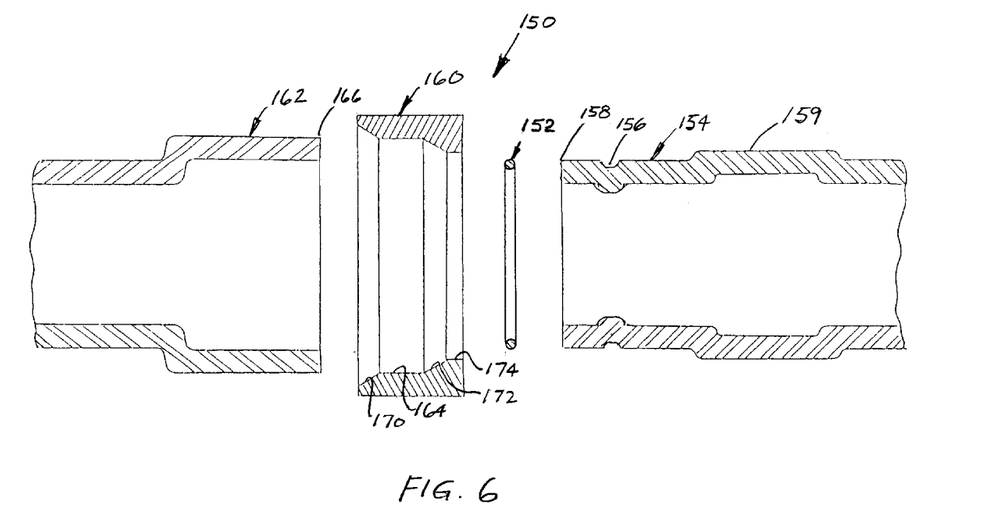
FIG. 6 is a sectional view of a third embodiment of a fitting assembly prior to assembly.
Figure 7:
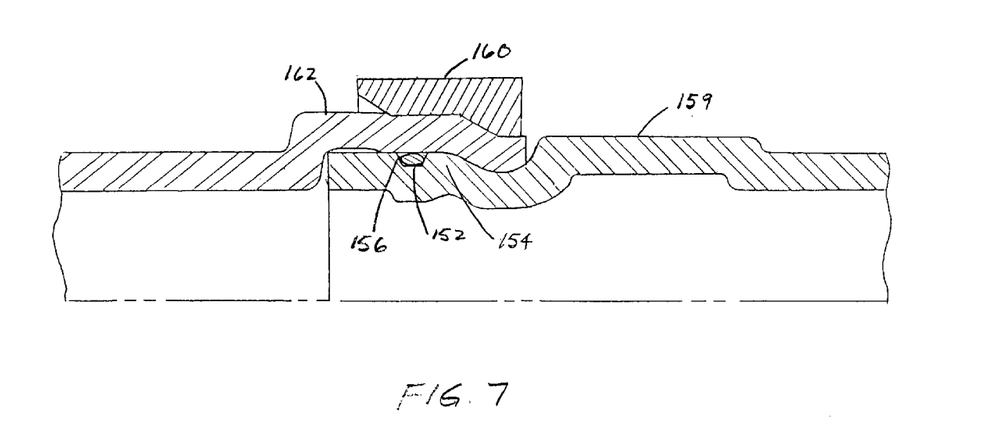
FIG. 7 is a partial sectional view of the fitting assembly of FIG. 6 after a ring is swaged over a female body.

FIGS. 6 and 7 illustrate a third embodiment of a fitting assembly 150 of the present invention. The third embodiment is the same as the first, but includes an additional O-ring 152 surrounding a male member 154. The male member 154 of the third embodiment further has a channel 156 formed between the distal end 158 of the male member and an upset 159 formed axially inward of the male member 154.

Situated in the channel 156 is the elastomeric O-ring 152. The channel 154 retains the O-ring 152 onto the male member 154 and prevents the O-ring 152 from sliding or rolling axially along the male member 154. The channel 156 is located in a portion of the male member 154 such that, after a swaging ring 160 is fully swaged around a female body 162, the portion of the female body 162 radially outward of the channel 156 is crushed radially inward, but the male member 154 is not crushed. Thus, a first cylindrical surface 164 of the ring 160 is located radially outward of the channel 156 after the ring 160 is fully waged around the female body 162.

The third embodiment of a fitting assembly 150 functions the same as the first embodiment, but provides a channel formed on the male member and an O-ring situated in the channel. The O-ring 152 is pre-installed in the channel 156. The male member 154 is inserted into the female body 162 until the terminal end 166 of the female body 162 abuts the upset 159. The ring 160 is slid over the female body 162. The trailing end of a first conical surface 170 and the first cylindrical surface 164 apply a radially inward force crushing the female body 162 radially inward. Located between the channel 156 of the male member 154 and the female body 162 is the O-ring 152. The radially inward force 152 compresses the O-ring tightly between the channel 156 of the male member 154 and the female body 162 to create an effective seal. A second conical surface 172 and a second cylindrical surface 174 then apply a greater radially inward force, crushing the female body 162 and the male member 154 radially inward to prevent the male member 154 from withdrawing from the female body 162.

Figure 8:
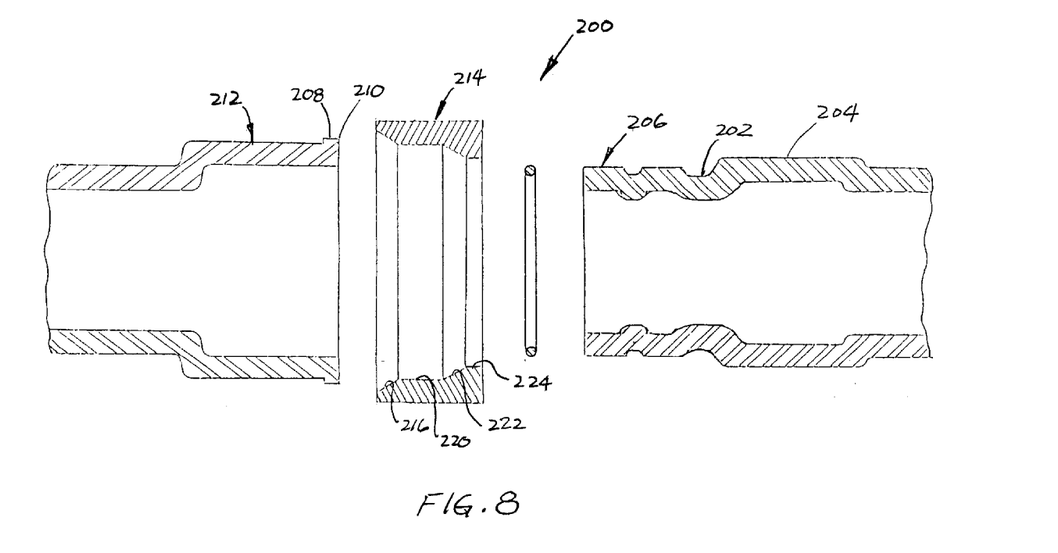
FIG. 8 is a sectional view of a fourth embodiment of a fitting assembly prior to assembly.
Figure 9:
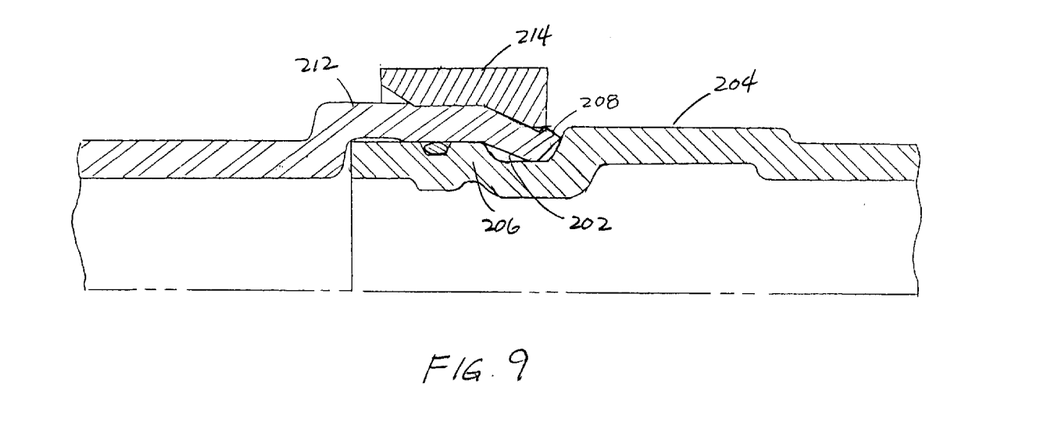
FIG. 9 is a partial sectional view of the fitting assembly of FIG. 8 after a ring is swaged over a female body.

FIGS. 8 and 9 illustrate a fourth embodiment of a fitting assembly 200 of the present invention. The fourth embodiment is the same as the third, but includes a second channel 202 adjacent to an upset 204 formed axially inwardly of a male member 206 and a radially outward protrusion 208 at the terminal end 210 of a female body 212. Upon full insertion of the male member 206 into the female body 212, the protrusion 208 is directly radially outward of the second channel 202 of the male member 206.

The fourth embodiment of a fitting assembly 200 functions the same as the first, but provides a second channel formed on the male member and a protrusion at the terminal end of the female body. The male member 206 is inserted into the female body 212 until the terminal end 210 of the female body 212 abuts the upset 204. A ring 214 is slid over the female body 212. The trailing end of a first conical surface 216 and a first cylindrical surface 220 first apply a radially inward force crushing and deforming the protrusion 208 radially inward toward the second channel 202. The trailing end 218 of the first conical surface 216 and the first cylindrical surface 220 then apply a radially inward force, crushing the remaining portion of the female body 212 radially inward. A second conical surface 222 and a second cylindrical surface 224 then apply a greater radially inward force, further crushing and deforming the protrusion 208 into the second channel 202 of the male member 206. The deformed protrusion 208 acts as an abutment surface, preventing the withdrawal of the male member 206 from the female body 212. Since the second conical surface 222 and the second cylindrical surface 224 do not crush the male member 206 radially inward, less effort is required to swage the ring 214 over the female body 212.

Figure 10:
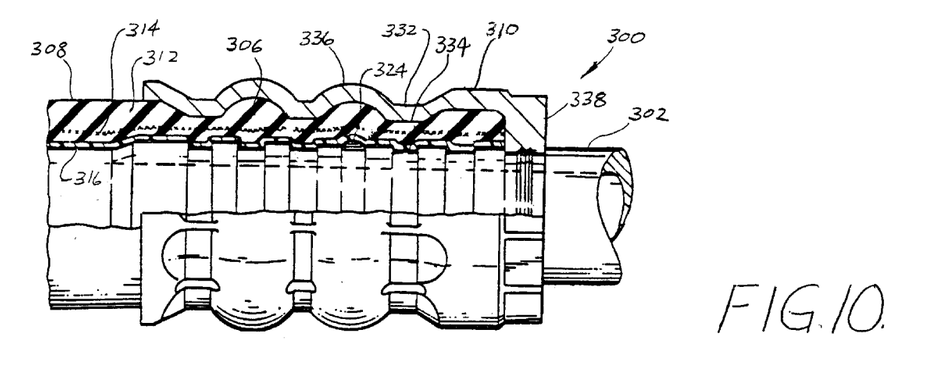
FIG. 10 is a partial sectional view of a fifth embodiment of a fitting assembly as assembled.
Figure 11:
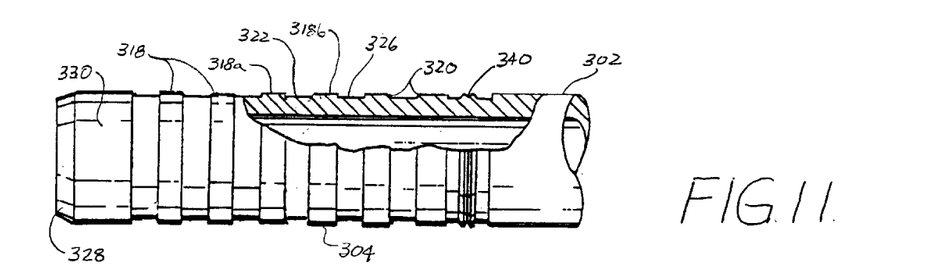
FIG. 11 is a partial sectional view of the first tube of FIG. 10.

FIGS. 10 and 11 illustrate a fifth embodiment of a fitting assembly 300 of the present invention. The fitting assembly includes a first tube 302 having a male member 304 received within a female body 308 of a second tube 306. A portion of a deformable cylindrical ring or sleeve 310 is fixed at one end to the first tube 302. The remainder of sleeve 310 overlies the female body 308 for substantially the full length of male member 304 and is crimped in a manner described below about the second tube 306 to secure and seal the fitting assembly 300.

The second tube 306 is of the composite reinforced type and includes an outer layer 312 typically of a suitable synthetic rubber material such as styrene butadiene, and the like, with an intermediate layer of suitable reinforcing material such as a braided fiber material 314 such as polyamide or polyester fabric or the like disposed therebetween. An inner liner 316 is also provided which is fabricated from a suitable polymeric material such polyamide, polyethylene or other similar material.

The male member 304 comprises an elongated generally cylindrical body portion having a plurality of spaced annular radially outwardly extending ribs 318 provided on the outer surface thereof adjacent one end. Each of the ribs is defined by sidewalls 320 extending substantially perpendicularly to the longitudinal axis of first tube 302. Disposed between ribs 318a and 318b, which constitute sealing ribs, is an annular sealing channel 322 which is adapted to receive a polymeric strip 324.

The polymeric strip 324 is a thin strip of polymeric material. A layer of adhesive is applied to one surface of the strip 324. The strip 324 with adhesive applied can be rolled up for storage, similar to a roll of tape. The rolled strip can later be wrapped around the male member 304 to provide a layer of polymeric material surrounding and bonded to the male member 304. The strip 324 is bonded to the male member 304 but is not bonded to the female body 308 of the second tube 306. Since the strip 324 does not have any adhesive characteristic on the outer surface, the concern of contaminants attaching to the strip 324 has been eliminated, allowing the strip 324 to be wrapped around the male member 304 well before the male member 304 is inserted into the female body 308. Suitable polymeric materials for forming the strip 324 include, but are not limited to, elastomers, fluoropolymers, polyamides, polyesters, polyurethanes, polyvinyl chlorides, polyketones, polyolefins and mixtures thereof. The preferred polymeric material for forming the strip 324 is elastomer.

Disposed between each of the ribs 318 on opposite sides of the sealing channel 322 are locking channels 326. Each of the ribs 318 are of equal diameter to that of the nominal diameter of the first tube 302. The male member 304 may therefore by machined or roll formed. If roll formed, it is desirable that the outside diameter of the ribs 318 be held as closely as possible to that of the remainder of the first tube 302. At the terminal end of the male member 304, there is formed a transition member which includes a tapered end portion 328 and a guide surface 330 having the same outside diameter as that of the ribs 318.

The female body 308 of the second tube 306 is secured to first tube 302 by the sleeve 310 surrounding the female body 308 of the second tube 306 and adapted to be swaged, crimped or otherwise radially inwardly compressed at a plurality of axially spaced locations 332 therealong so as to clamp second tube 306 between first tube 302 and sleeve 310. As clamped, there will be formed at each of the crimp locations 332 a radially inwardly directed crimp rib 334 and a centrally located crown 336 between each crimping 332. It will be noted that each of the crimp ribs 334 are disposed directly above a respective locking channel 326 and that the polymeric strip 324 is located directly under one of the crowns 336.

To assemble the present invention, the polymeric strip 324 is wrapped around the sealing channel 322 where a portion thereof extends radially beyond the sealing ribs 318a and 318b. Thereafter, the female body 308 of the second tube 306 is slid onto the male member 304 of the first tube 302. Preferably, the inside diameter of the female body 308 is slightly less than the outside diameter of the male member 304 and thus placing the liner 316 in tension when it is assembled to the male member 304. As the female body 308 is slipped onto the male member 304, the female body 308 is expanded by the tapered end 328 of the male member 304. The guide surface 330 then guides the female body 308 over the ribs 318 and the polymeric strip 324 with minimum interference. Upon the female body 308 slipped over the polymeric strip 324, the polymeric strip 324 is substantially compressed within the sealing channel 322 by the liner 316.

Next, sleeve 310 is positioned in overlaying relationship to the female body 308 of the second tube 306 within which the male member 304 is received. Sleeve 310 is thereafter deformed at a plurality of locations 332. The compressive force exerted at each location 334 cold forms the polymeric liner 316 causing it to flow into and substantially completely fill the respective locking channels 326. Over time, the locking channels 326 will become completely filled as the liner 316 initially flows at the higher operating temperatures. At the same time, each crown 336 is held substantially to its original outside diameter. Concurrently with or preceding the crimping of the sleeve 310 at locations 332, the end portion 338 of the sleeve is swaged or crimped on one or more fitting locking ribs 340 formed on the male member 304.

Figure 12:
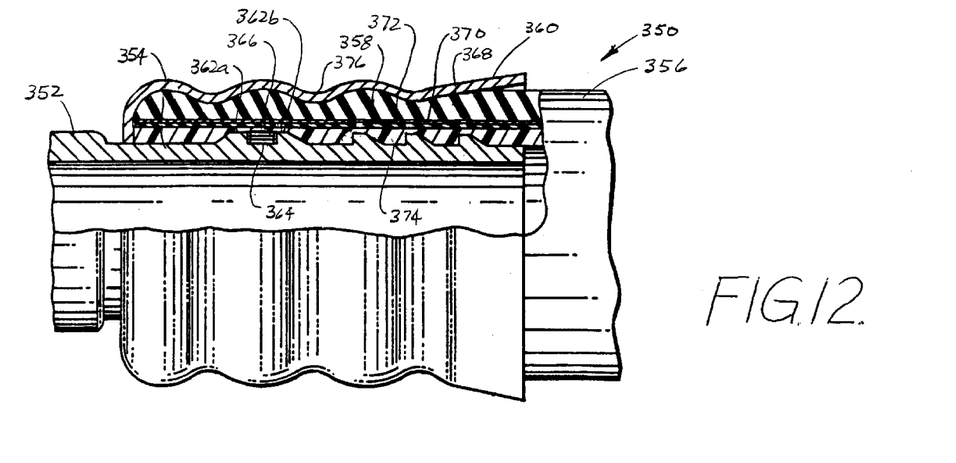
FIG. 12 is a partial sectional view of a sixth embodiment of a fitting assembly as assembled.

FIG. 12 illustrates a sixth embodiment of a fitting assembly of the present invention. The fitting assembly 350 includes a first tube 352 having a male member 354 received within a female body 358 of a second tube 356 and secured therein by means of a deformable cylindrical ring or sleeve 360.

The male member 352 comprises an elongated generally cylindrical body portion having a plurality of spaced annular radially outwardly extending ribs 362 provided on the outer surface thereof adjacent one end. Ribs 362a and 362b define a sealing channel 364 which is adapted to receive a polymeric strip 366.

The polymeric strip 366 is a thin strip of polymeric material. A layer of adhesive is applied to one surface of the strip. The strip with adhesive applied can be rolled up for storage, similar to a roll of tape. The rolled strip can later be wrapped around the male member to provide a layer of polymeric material surrounding and bonded to the male member 354. The strip is bonded to the male member 354 but is not bonded to the female body 358 of the second tube 356. Since the strip 366 does not have any adhesive characteristic on the outer surface, the concern of contaminants attaching to the strip 366 has been eliminated, allowing the strip 366 to be wrapped around the male member 354 well before the male member 354 is inserted into the female body 358. Suitable polymeric materials for forming the strip include, but are not limited to, elastomers, fluoropolymers, polyamides, polyesters, polyurethanes, polyvinyl chlorides, polyketones, polyolefins and mixtures thereof. The preferred polymeric material for forming the strip is elastomer.

Second tube 356 includes an outer layer 368 typically of a suitable synthetic rubber material with a layer of suitable reinforcing material such as a braided fiber material 370 disposed between the inner surface of the outer layer 368 thereof and another layer 372 of synthetic rubber material. An inner liner 374 is also provided which is fabricated from a suitable polymeric material such as for example polyamide, teflon, polyethylene or other similar material.

In order to secure the second tube 356 to the first tube 352, a sleeve 360 is provided surrounding the female body 358 of the second tube 356 which is adapted to be swaged, crimped or otherwise radially inwardly compressed at a plurality of axially spaced locations 376 therealong so as to clamp the second tube 356 between the first tube 352 and the sleeve 360. This compressive force operates to compress the polymeric strip 366 slightly thereby forming a fluid-tight secure seal between the strip 366 and liner 374. It should also be noted that sealing channel 364 is preferably located along the length of male member 354 of first tube 352 so as to position the strip 366 approximately midway between crimps 376 so as to avoid excessive compression force thereon.

To assemble the present invention, the polymeric strip 366 is wrapped around the sealing channel 364 of the male member 354. Thereafter, the female body 358 of the second tube 356 is expanded and the male member 354 along with the polymeric strip 366 wrapped thereon is inserted within the female body 358. It should be noted that preferably the inside diameter of female body 358 is slightly less than the outside diameter of male member 354 and thus placing the liner 374 in tension when second tube 356 is assembled to first tube 352. Next, sleeve 360 is positioned in overlying relationship to the portion of second tube 356 within which end first tube 352 is received and is thereafter deformed at a plurality of locations so as to effect a secure mechanically strong fluid-tight sealing relationship therebetween.

Various features of the present invention have been described with reference to the embodiments shown and described. It should be understood, however, that modifications may be made without departing from the spirit and scope of the invention as represented by the following claims.

What is claimed is:

1. A fitting assembly for fluid and vapor connection comprising:
    a first tube having a male member formed at end of said first tube, said male member has a channel formed thereon;
    a second tube having a hollow female body formed at end of said second tube, said female body has a radially extending protrusion at distal end of said female member, said male member received in said female body;

a thin strip of polymeric material having a layer of adhesive applied to one surface of said strip, said strip bonded to said male member and unbonded to said female body, said strip compressed between said male member and said female body; and a ring surrounding said female body, said ring deforms said protrusion radially inwardly into said channel of said male member.

2. The fitting assembly as claimed in claim 1 wherein said polymeric material for forming said strip is selected from a group consisting of elastomers, fluoropolymers, polyamides, polyesters, polyurethanes, polyvinyl chlorides, polyketones, polyolefins and mixtures thereof.

3. The fitting assembly as claimed in claim 1 wherein said polymeric material for forming said strip is elastomer.

4. The fitting assembly as claimed in claim 1 wherein said first tube is formed of a metallic material.

5. The fitting assembly as claimed in claim 4 wherein said metallic material is aluminum.

6. The fitting assembly as claimed in claim 1 wherein said male member has a rib extending radially outwardly.

7. The fitting assembly as claimed in claim 1 wherein said male member has a channel formed thereon.

8. The fitting assembly as claimed in claim 1 wherein said strip is wrapped around said male member.

9. The fitting assembly as claimed in claim 7 wherein said strip is wrapped around said channel of said male member.

10. The fitting assembly as claimed in claim 7 wherein said female body has a inner liner layer, said inner liner layer fills said channel of said male member.

11. The fitting assembly as claimed in claim 10 wherein said material for forming said inner liner layer is selected from a group consisting of polyamide, teflon and polyethylene.

12. The fitting assembly as claimed in claim 1 wherein said ring adapted to be crimped radially inwardly so as to clamp said female body between said male member and said ring.

13. The fitting assembly as claimed in claim 1 wherein said female body is formed of a metallic material.

14. The fitting assembly as claimed in claim 1 wherein said female body is formed of a polymeric material.

15. A fitting assembly for fluid and vapor connection comprising:

a first tube having a male member formed at end of said first tube;

a second tube having a hollow female body formed at end of said second tube, said male member received in said female body; and a thin strip of polymeric material having a layer of adhesive applied to one surface of said strip, said strip bonded to said male member and unbonded to said female body, said strip compressed between said male member and said female body to create a seal.

16. The fitting assembly as claimed in claim 15 wherein said polymeric material for forming said strip is selected from the a group consisting of elastomers, fluoropolymers, polyamides, polyesters, polyurethanes, polyvinyl chlorides, polyketones, polyolefins and mixtures thereof.

17. The fitting assembly as claimed in claim 15 wherein said polymeric material for forming said strip is elastomer.

18. The fitting assembly as claimed in claim 15 wherein said male member has a channel formed thereon, said strip is wrapped around said channel of said male member.

19. The fitting assembly as claimed in claim 15 further comprising a ring having an axial bore with an innermost diameter smaller than diameter of a portion of said female body for deforming said portion of said female body radially inwardly.

20. The fitting assembly as claimed in claim 15 further comprising a ring surrounding said female body, said ring adapted to be crimped radially inwardly so as to clamp said female body between said male member and said ring.

21. The fitting assembly as claimed in claim 15 wherein first tube is formed of a metallic material.

22. The fitting assembly as claimed in claim 15 wherein said second tube is formed of a metallic material.

23. The fitting assembly as claimed in claim 15 wherein said second tube is formed of a polymeric material.

24. A method for forming a fluid or vapor connection, said method comprising the steps of:

providing a first tube having a male member formed at end of said first tube;

providing a second tube having a hollow female body formed at end of said second tube;

providing a thin strip of polymeric material having a layer of adhesive applied to one surface of said strip;

wrapping said strip of polymeric material around said male member;

inserting said male member into said female body; and compressing said strip of polymeric material between said male member and said female body to create a seal.

25. The method of claim 24 further comprising the step of providing a ring.

26. The method of claim 25 further comprising the step of sliding said ring over said female and applying a radially inwardly force deforming said female body radially inwardly.

27. The method of claim 25 further comprising the step of crimping said ring radially inwardly so as to clamp said female body between said male member and said ring.

* * * * *